US006977094B2

(12) United States Patent
Oles et al.

(10) Patent No.: US 6,977,094 B2
(45) Date of Patent: *Dec. 20, 2005

(54) PROCESS FOR PRODUCING ARTICLES WITH ANTI-ALLERGIC SURFACES

(75) Inventors: Markus Oles, Hattingen (DE); Edwin Nun, Billerbeck (DE); Ingo Pauli, Frankfurt (DE)

(73) Assignee: Degussa AG, Duesseldorf (DE)

( * ) Notice: Subject to any disclaimer, the term of this patent is extended or adjusted under 35 U.S.C. 154(b) by 220 days.

This patent is subject to a terminal disclaimer.

(21) Appl. No.: 10/309,895

(22) Filed: Dec. 5, 2002

(65) Prior Publication Data

US 2003/0124301 A1    Jul. 3, 2003

(30) Foreign Application Priority Data

Dec. 5, 2001    (DE) ................................. 101 59 767

(51) Int. Cl.⁷ ............................................... B05D 1/02
(52) U.S. Cl. ...................... 427/2.1; 427/180; 427/256; 427/288; 427/421; 427/430.1
(58) Field of Search .......................... 427/2.1, 180, 256, 427/421, 288, 430.1

(56) References Cited

U.S. PATENT DOCUMENTS

| | | | |
|---|---|---|---|
| 3,354,022 A | 11/1967 | Dettre et al. | |
| 6,156,409 A * | 12/2000 | Doushita et al. | 428/143 |
| 6,660,363 B1 * | 12/2003 | Barthlott | 428/141 |
| 6,811,856 B2 * | 11/2004 | Nun et al. | 428/143 |
| 6,852,389 B2 * | 2/2005 | Nun et al. | 428/143 |
| 6,858,284 B2 * | 2/2005 | Nun et al. | 428/149 |

| | | | |
|---|---|---|---|
| 2003/0013795 A1 | 1/2003 | Nun et al. | |
| 2003/0152780 A1 * | 8/2003 | Baumann et al. | 428/429 |

FOREIGN PATENT DOCUMENTS

| | | |
|---|---|---|
| EP | 0 933 388 | 8/1999 |
| EP | 1 138 362 | 10/2001 |
| EP | 1 283 076 | 2/2003 |
| WO | WO 96/04123 | 2/1996 |
| WO | WO 00/58410 | 10/2000 |

OTHER PUBLICATIONS

Derwent Search Report—US6858284/pn.
Derwent Search Report—US6852389/pn.
Derwent Search Report—US6811856/pn.

* cited by examiner

Primary Examiner—Jennifer Michener
(74) Attorney, Agent, or Firm—Oblon, Spivak, McClelland, Maier & Neustadt, P.C.

(57) ABSTRACT

A process for producing anti-allergic surfaces, and articles which comprise these anti-allergic surfaces. The process of the invention produces anti-allergic surfaces. The basis of the anti-allergic action is that self-cleaning properties make it impossible or very difficult for allergenic substances to deposit on these surfaces, and make it possible for them to be cleaned from the surface by a simple cleaning procedure using water set in motion. The surfaces may be either textile surfaces or polymer surfaces. Structures composed of elevations and depressions, as have been described on many previous occasions, are applied to these surfaces. The coatings of the invention can be applied very simply by applying a dispersion of suitable particles in a solvent to the relevant surface and then removing the solvent. Textiles, mattresses, or covers, for example, can be provided with the anti-allergic surfaces of the invention.

14 Claims, 1 Drawing Sheet

PROCESS FOR PRODUCING ARTICLES WITH ANTI-ALLERGIC SURFACES

BACKGROUND OF THE INVENTION

1. Field of the Invention

The present invention relates to a process for producing anti-allergic surfaces, where the anti-allergic properties are achieved, for example, by coating with silica particles.

2. Discussion of the Background

About 15% of the German population is allergic to house dust. However, people allergic to house dust do not actually react to dust but to the allergens which are present in the dust and come into contact with the body together with the dust, e.g. via respiration. Examples of typical allergens are grass pollen and floral pollen. House dust mites are responsible for a further major proportion of house dust allergy, since many people have an allergic reaction to their feces or constituents of the same. There are mites in many locations within a house, e.g. in mattresses, pillows, covers, or thick carpets. The food used by the mites is organic particles, in particular human or animal skin dander.

A wide variety of methods is nowadays used to reduce mite numbers. Besides wet-wiping or washing of contaminated surfaces, intensive vacuum-cleaning of the surfaces provides temporary relief, and the vacuum cleaners used here should be those which have high suction power and have an exhaust-air particle filter. The vacuum-cleaning method is often used particularly in the case of carpets, fleeces and bedside rugs, but without achieving lasting results, since complete cleaning is generally impossible.

Many applications have disclosed self-cleaning surfaces which can be cleaned by water set in motion. The advantage of these surfaces is that even small amounts of water are sufficient to free the surfaces completely from dust and other contamination. None of these applications describes the production of articles with anti-allergic surfaces.

SUMMARY OF THE INVENTION

It was therefore an object of the present invention to provide articles, in particular textiles, which can be freed from deposits of allergenic substances in a simple and rapid manner, and thus have anti-allergic properties.

Surprisingly, it has now been found that after treatment with water, e.g. by washing or by treatment with a wet-suction machine, there are markedly fewer mites colonizing, or residing in, textiles which have self-cleaning surfaces than in conventional textiles. The reason for this is probably that the dust particles, in particular organic dust particles, which the mites use as food are almost completely removed from the textiles having self-cleaning surfaces by the treatment with water. It has also been found that there is a markedly lower level of allergenic substances lastingly attached to the articles which have self-cleaning surfaces.

The present invention therefore provides a process for producing articles with anti-allergic surfaces, which comprises providing the articles with a self-cleaning surface composed of elevations and/or depressions, the elevations having a separation of from 20 nm to 100 $\mu$m and a height of from 20 nm to 100 $\mu$m.

The present invention also provides the use of the process of the invention for producing anti-allergic surfaces on carpeting, protective films for furniture, mattresses, feather-filled quilts, wallpapers, protective coatings, or covers.

The present invention also provides articles, in particular carpeting, protective films for furniture, mattresses, feather-filled quilts, wallpapers, protective coatings, covers, and textiles, which have an anti-allergic surface, produced by the process of the invention.

The process of the invention has the advantage of being very simple to carry out. Depending on the embodiment of the process of the invention, lasting or temporary anti-allergic surfaces with self-cleaning properties are provided, from which allergenic substances can be removed by water set in motion.

A more complete appreciation of the invention and many of the attendant advantages thereof will be readily obtained as the same becomes better understood by reference to the following Figures in conjunction with the detailed description below.

DETAILED DESCRIPTION OF THE INVENTION

Figure 1:
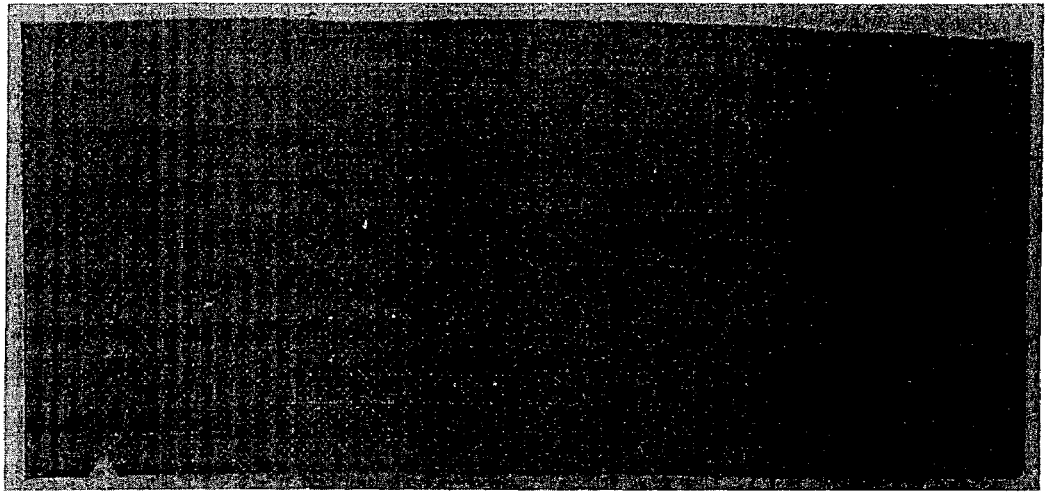
FIG. 1 shows an image of a polyethylene fabric as in Example 1, treated according to the invention. It can be seen that hardly any pollen has remained on the fabric.
Figure 2:
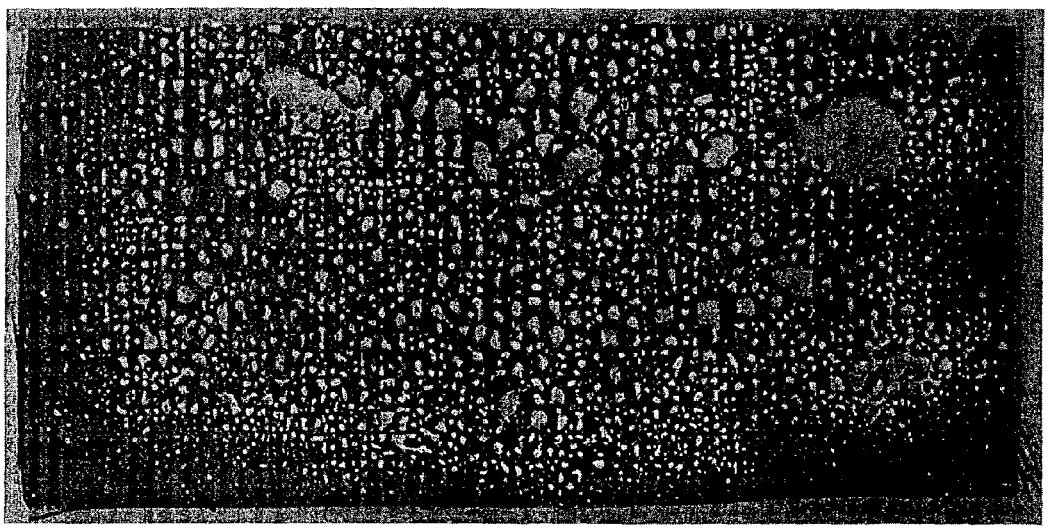
FIG. 2 shows, for comparison, a polyethylene fabric not treated according to the invention and exhibiting marked contamination with pollen even after spraying with water as in Example 1.

Since a major proportion of house dust allergy is attributable to house dust mites, the feces of which or constituents of the same cause allergic reaction in many people, it is also advantageous that there is little adhesion of organic particles to the surfaces of the articles produced according to the invention, in particular of human and animal skin dander, since these are used by the mites as food. It is therefore particularly advantageous for articles in the household sector, e.g. mattresses, pillows, covers, or thick carpets, to be provided with the anti-allergic surfaces.

The process of the invention for producing articles with anti-allergic surfaces is described below by way of example, but there is no intention that the invention be restricted thereto. The process is based on the use of the self-cleaning effect for articles where anti-allergic effects are desirable.

The process of the invention for producing articles with anti-allergic surfaces comprises providing the articles with a self-cleaning surface composed of elevations and/or depressions, where the elevations have a separation of from 20 nm to 100 $\mu$m and a height of from 20 nm to 100 $\mu$m. This range for the separation includes all specific values and subranges therebetween, such as 25 nm, 30 nm, 40 nm, 50 nm, 100 nm, 250, 500 nm, 1 $\mu$m, 2 $\mu$m, 5 $\mu$m, 10 $\mu$m, 25 $\mu$m, 50 $\mu$m, 75 $\mu$m, and 90 $\mu$m. This range for the height includes all specific values and subranges therebetween, such as 25 nm, 30 nm, 40 nm, 50 nm, 100 nm, 250, 500 nm, 1 $\mu$m, 2 $\mu$m, 5 $\mu$m, 10 $\mu$m, 25 $\mu$m, 50 $\mu$m, 75 $\mu$m, and 90 $\mu$m.

The articles may have been selected from articles comprising films, comprising wallpapers, or comprising fibers, for example. Preferred articles comprising fibers are articles comprising knits, comprising wovens, comprising nonwovens, or comprising felts. Particular preference is given to the articles comprising fibers and selected from cushions, carpets, carpeting, mattresses, feather-filled quilts, protective coatings, covers, industrial textiles, and items of clothing. Articles with anti-allergic surfaces are in particular those articles which are in direct contact with humans and/or animals, in particular birds or mammals.

The process of the invention is very particularly preferably used to produce articles with anti-allergic surfaces which are in direct contact with humans and animals, since the risk of transmission of allergenic substances from one individual to another is particularly high with these articles. Particularly good self-cleaning properties are achieved if the surface structure has hydrophobic elevations with a height of from 50 nm to 20 μm, preferably from 500 nm to 10 μm, and very particularly preferably from 0.1 to 5 μm, and with a separation smaller than 100 μm, preferably a separation of from 50 nm to 75 μm, and very particularly preferably from 500 nm to 5 μm. Surface structures which have particularly good anti-allergic properties with respect to pollen are those which have hydrophobic elevations with a height of from 30 μm to 1 μm, the elevations having a separation which is likewise from 30 μm to 1 μm, since these structures are sufficiently small to eliminate or reduce penetration of the pollen between the elevations and physical or chemical attachment between the elevations.

The surface structure may be produced on the surface of the articles themselves. One way of achieving this is application and securing of particles to the surface of the articles to produce a surface structure. The application and securing of the particles may take place via adhesive bonding, impression, roller-impression, or embedment onto or into the surface of the articles. Various relatively new methods of securing or impression are found, inter alia, in the patent applications DE 10129116, DE 10138036, and DE 10134477, all incorporated herein by reference.

Examples of possible methods are described below.

During the production of fibers, after discharge of the polymer melt from the spinning die during the spinning process the particles are introduced into the surface of the polymer by means of a gas stream (DE 10129116, incorporated herein by reference). The particles are secured on the polymeric fibers by solidification of the polymers. The skilled worker will readily arrive at similar methods of securing in which the particles are introduced into a viscous surface or applied to a viscous surface, and the viscous surface solidifies by cooling, evaporation of solvent, or by chemical reaction.

Another process, described in DE 10134477, incorporated herein by reference, for producing self-cleaning surfaces with self-regenerating self-cleaning effect, in which a suitable at least to some extent hydrophobic surface structure is created by securing particles on a surface by means of a carrier is based on the use of a mixture of particles and binder. Naturally, the use of a carrier in which no particles are present is possible, and this then corresponds to a normal process of application by adhesive bonding.

The particles used may be particles which comprise at least one material selected from silicates, doped or fumed silicates, minerals, metal oxides, silicas, metals, and polymers. It is preferable to use particles which have a diameter of from 0.02 to 100 μm, particularly preferably from 0.03 to 50 μm, and very particularly preferably from 0.03 to 1 μm. This particle size is therefore advantageous, because it is smaller than the usual particle size of pollen and therefore achieves a better self-cleaning effect on these surfaces. The articles of the invention preferably have surfaces on which the individual particles are present at separations of from 0 to 10 particle diameters, in particular from 4 to 8 or from 1 to 3 particle diameters.

The particles may also be aggregates or agglomerates, and according to DIN 53 206, incorporated herein by reference, aggregates here are primary particles in edge or surface-contact, while agglomerates here are primary particles in point-contact. The particles used may also be particles formed when primary particles combine to give agglomerates or aggregates whose size is from 0.2 to 100 μm.

It can be advantageous for the particles used to have a structured surface. It is preferable to use particles whose surface has an irregular fine structure in the nanometer range. The fine structure of the particles is preferably a fissured structure with elevations and/or depressions in the nanometer range. The elevations preferably have an average height of from 20 to 500 nm, particularly preferably from 50 to 200 nm. The separation of the elevations or depressions on the particles is preferably less than 500 nm, very particularly preferably less than 200 nm.

The particles used, in particular the particles whose surface has an irregular fine structure in the nanometer range, are preferably particles which comprise at least one compound selected from fumed silica, aluminum oxide, silicon oxide, fumed silicates, and pulverulent polymers, and metals. It can be advantageous for the particles used to have hydrophobic properties. The very particularly suitable particles are, inter alia, hydrophobicized fumed silicas, known as Aerosils.

It can be advantageous for the surfaces to comprise particles which have hydrophobic properties. The hydrophobic properties of the particles may be inherently present by virtue of the material used for the particles. However, it is also possible to use hydrophobicized particles which have hydrophobic properties by virtue of treatment with at least one compound from the group of the alkylsilanes, perfluoroalkylsilanes, paraffins, waxes, fatty esters, functionalized long-chain alkane derivatives, and alkyldisilazanes, for example.

In another embodiment of the process of the invention, the surface structure produced is a film or is produced on a film, which is transferred to the surface of the article which is to be provided with an anti-allergic surface. The production of these films is described in EP 0 933 388, incorporated herein by reference, for example, or more specifically in DE 10138036, incorporated herein by reference. The structured surfaces described in DE 10138036, incorporated herein by reference, the structure of which is formed by elevations, have adjacent elevations connected by ridges whose average height is smaller than the elevations which they connect. DE 10138036, incorporated herein by reference, describes by way of example a process for producing structured surfaces by molding from a negative mold onto an unstructured surface, the negative mold used in the process having a surface composed of sections of spheres or rounded-off pyramid frusta, with valley-shaped incisions between the sphere sections. The ridges connecting the elevations give the structures markedly higher stability. It is also possible to use any other negative mold which can produce elevations of the required dimension. The impression may be transferred to the surface by an impression or rolling process or during macroscopic molding of the articles by casting, injection molding or in-mold decoration (IMD).

It can be advantageous for the surfaces which have been provided with the surface structure to be hydrophobicized again subsequently. This can be achieved by treating the surfaces with the compounds given for hydrophobicizing the particles.

The self-cleaning surface is particularly preferably applied by applying a suspension which comprises particles in a solvent, and then removing the solvent. Examples of methods of applying the suspension to at least one surface of an article are dipping the article into the suspension or spraying, spray-application, spreading, or doctor-application of the suspension onto the article or onto at least one surface of the article.

It can be advantageous for the surface of the article not to be solvated by the solvent and for the particles to adhere to the surface of the article after removal of the solvent. In this embodiment of the process of the invention, the solvent used comprises at least one suitable compound which does not solvate the surface of the article to be treated, from the group of the alcohols, the glycols, the ethers, the glycol ethers, the ketones, the esters, the amides, the nitro compounds, the halogenated hydrocarbons, and the aliphatic and aromatic hydrocarbons, or comprises a mixture of these.

It can also be advantageous for the surface of the article to be solvated by the solvent and for the coating to have been anchored within the surface of the article after removal of the solvent. This embodiment of the process of the invention is preferably used with articles which have a surface which is solvated by a solvent and which preferably comprises polymers based on polycarbonates, on poly(meth)acrylates, on polyamides, on PVC, on polyethylenes, on polypropylenes, on aliphatic linear or branched alkene polymers, on cyclic alkenes, on polystyrenes, on polyesters, on polyether sulfones, on polyacrylonitrile, or on polyalkylene terephthalates, or else comprises their mixtures or copolymers. The suitable solvent used preferably comprises at least one compound suitable as a solvent for the appropriate surface from the group of the alcohols, the glycols, the ethers, the glycol ethers, the ketones, the esters, the amides, the nitro compounds, the halogenated hydrocarbons, and the aliphatic and aromatic hydrocarbons, and mixtures of these. A very particularly preferred solvent used comprises at least one compound suitable as a solvent for the appropriate surface, selected from methanol, ethanol, propanol, butanol, octanol, cyclohexanol, phenol, cresol, ethylene glycol, diethylene glycol, diethyl ether, dibutyl ether, anisole, dioxane, dioxolane, tetrahydrofuran, monoethylene glycol ether, diethylene glycol ether, triethylene glycol ether, polyethylene glycol ether, acetone, butanone, cyclohexanone, ethyl acetate, butyl acetate, isoamyl acetate, ethylhexyl acetate, glycol ester, dimethylformamide, pyridine, N methylpyrrolidone, N methylcaprolactone, acetonitrile, carbon disulfide, dimethyl sulfoxide, sulfolane, nitrobenzene, dichloromethane, chloroform, carbon tetrachloride, trichloroethene, tetrachloroethene, 1,2 dichloroethane, chlorophenol, (hydro)chlorofluorocarbons, petroleum spirits, petroleum ether, cyclohexane, methylcyclohexane, decalin, tetralin, terpenes, benzene, toluene, xylene, and mixtures of these.

In the process of the invention for applying solvents which comprise particles to the surface of articles, the solvent preferably has a temperature of from −30° C. to 300° C., with preference from 25 to 100° C., prior to application to the surface. This range includes all specific values and subranges therebetween, such as −20, −10, 0, 10, 30, 50, 75, 100, 150, 200, and 250° C.

The process of the invention may be used for producing anti-allergic surfaces on carpeting, protective films for furniture, mattresses, feather-filled quilts, wallpapers, protective coatings, drapes, curtains, duvets, or covers. These articles may either be provided subsequently with anti-allergic surfaces or else be produced using articles, e.g. fibers or materials, which have self-cleaning properties.

The subject matter of the invention in particular encompasses carpeting, protective films for furniture, mattresses, feather-filled quilts, wallpapers, protective coatings, covers, textiles, and particularly items of clothing, which have an anti-allergic surface produced by the process of the invention.

FIGS. 1 and 2 provide further illustration of the inventive process and articles produced by this process, but there is no intention that the invention be restricted to these embodiments.

EXAMPLES

Having generally described this invention, a further understanding can be obtained by reference to certain specific examples which are provided herein for purposes of illustration only and are not intended to be limiting unless otherwise specified.

Example 1

A commercially available polyethylene fiber textile is divided into two halves. One half is dipped into a suspension, heated to 80° C., of decalin and 1% by weight of Aerosil R8200 (Degussa AG). After a contact time of 30 seconds, the textile is removed from the suspension and dried at room temperature. After a drying time of 5 hours, the textile halves are sprayed with pollen from the plant *Cedrus atlantica* (atlas cedar pollen) (yellow) and then sprayed with distilled water, the textiles having been clamped at an angle of 45° during this process. It was found that the textile half of the invention retained only very small amounts of the pollen initially applied (FIG. 1). The untreated textile half, in contrast, retained 65% of the pollen initially applied (FIG. 2).

Obviously, numerous modifications and variations of the present invention are possible in light of the above teachings. It is therefore to be understood that within the scope of the appended claims, the invention may be practiced otherwise than as specifically described herein.

This application is based on German Patent Application Serial No. 10159767.3, filed on Dec. 5, 2001, and incorporated herein by reference.

What is claimed is:

1. A process for producing an article with an anti-allergic surface, comprising:

applying particles to at least one surface of said article using a suspension which comprises particles in a solvent, solvating said surface of said article with the solvent, and then removing the solvent, to obtain a coating which has been anchored within the surface of the article after removal of the solvent, thereby obtaining said article having a self-cleaning, anti-allergic surface;

wherein said self-cleaning, anti-allergic surface comprises elevations and/or depressions, wherein the elevations have a separation of from 20 nm to 100 μm and a height of from 20 nm to 100 μm.

2. The process as claimed in claim 1, wherein the article comprises films, wallpapers, or fibers.

3. The process as claimed in claim 2, wherein the article comprising fibers comprises knits, wovens, nonwovens, or felts.

4. The process as claimed in claim 2, wherein the article comprising fibers is selected from the group consisting of cushions, carpets, carpeting, mattresses, feather-filled quilts, protective coatings, covers, industrial textiles, and items of clothing.

5. The process as claimed in claim 1, wherein the suspension is applied to at least one surface of an article by dipping the article into the suspension.

6. The process as claimed in claim 5, wherein the solvent comprises at least one compound selected from the group consisting of the alcohols, the glycols, the ethers, the glycol ethers, the ketones, the esters, the amides, the nitro compounds, the halogenated hydrocarbons, the aliphatic and aromatic hydrocarbons, and mixtures thereof.

7. The process as claimed in claim 6, wherein the particles have an average size of from 30 nm to 1 μm.

8. The process as claimed in claim 1, wherein the suspension is applied to at least one surface of an article by spraying the suspension onto the article.

9. The process as claimed in claim 8, wherein the surface which is solvated by a solvent comprises polymers based on polycarbonates, on poly(meth)acrylates, on polyamides, on PVC, on polyethylenes, on polypropylenes, on aliphatic linear or branched alkenes, on cyclic alkenes, on polystyrenes, on polyesters, on polyether sulfones, on polyacrylonitrile, or on polyalkylene terephthalates, or else comprises their mixtures or copolymers.

10. The process as claimed in claim 1, wherein the solvent comprises at least one compound selected from the group consisting of the alcohols, the glycols, the ethers, the glycol ethers, the ketones, the esters, the amides, the nitro compounds, the halogenated hydrocarbons, the aliphatic and aromatic hydrocarbons, and mixture thereof.

11. The process as claimed in claim 10, wherein the solvent comprises at least one compound selected from the group consisting of methanol, ethanol, propanol, butanol, octanol, cyclohexanol, phenol, cresol, ethylene glycol, diethylene glycol, diethyl ether, dibutyl ether, anisole, dioxane, dioxolane, tetrahydrofuran, monoethylene glycol ether, diethylene glycol ether, triethylene glycol ether, polyethylene glycol ether, acetone, butanone, cyclohexanone, ethyl acetate, butyl acetate, iso-amyl acetate, ethyihexyl acetate, glycol ester, dimethylformamide, pyridine, N methylpyrrolidone, N methylcaprolactone, acetonitrile, carbon sulfide, dimethyl sulfoxide, sulfolane, nitrobenzene, dichloromethane, chloroform, carbon tetrachloride, trichloroethene, tetrachloroethene, 1,2 dichloroethane, chlorophenol, (hydro)chloro-fluorocarbons, petroleum spirits, petroleum ether, cyclohexane, methylcyclohexane, decalin, tetralin, terpenes, benzene, toluene, xylene, and mixtures thereof.

12. The process as claimed in claim 1, wherein the solvent contains hydrophobic silica and has a temperature of from −30° C. to 300° C. prior to application to the surface.

13. The process as claimed in claim 1, wherein the particles have an average size of from 0.02 to 100 μm.

14. The process as claimed in claim 1, wherein the particles are hydrophobic.

* * * * *